United States Patent
Conrow et al.

(10) Patent No.: US 6,667,756 B2
(45) Date of Patent: *Dec. 23, 2003

(54) METHOD OF SHIFTING AN IMAGE OR PAPER TO REDUCE SHOW THROUGH IN DUPLEX PRINTING

(75) Inventors: Brian R. Conrow, Rochester, NY (US); David M. Kerxhalli, Rochester, NY (US)

(73) Assignee: Xerox Corporation, Stamford, CT (US)

(*) Notice: Subject to any disclaimer, the term of this patent is extended or adjusted under 35 U.S.C. 154(b) by 99 days.

(21) Appl. No.: 09/682,379

(22) Filed: Aug. 27, 2001

(65) Prior Publication Data
US 2003/0043256 A1 Mar. 6, 2003

(51) Int. Cl.$^7$ ................................................ B41J 2/435
(52) U.S. Cl. ........................................ 347/248; 347/234
(58) Field of Search ................................ 347/116, 234, 347/235, 248, 250, 129, 133, 249; 358/1.9; 399/402

(56) References Cited

U.S. PATENT DOCUMENTS

| | | | |
|---|---|---|---|
| 4,990,965 A | * 2/1991 | Kiya | 399/402 |
| 5,528,387 A | 6/1996 | Kelly et al. | 358/488 |
| 5,555,084 A | 9/1996 | Vetromile et al. | 399/16 |
| 5,610,651 A | * 3/1997 | Yamakawa et al. | 347/250 |
| 5,642,202 A | 6/1997 | Williams et al. | 358/406 |
| 5,697,608 A | 12/1997 | Castelli et al. | 271/228 |
| 5,725,211 A | 3/1998 | Blanchard et al. | 271/265.02 |
| 5,794,176 A | 8/1998 | Milillo | 702/150 |
| 5,821,971 A | 10/1998 | Rauch et al. | 347/134 |
| 5,889,545 A | 3/1999 | Rauch et al. | 347/134 |
| 5,892,854 A | 4/1999 | De Queiroz et al. | 382/288 |
| 6,141,464 A | 10/2000 | Handley | 382/287 |
| 6,178,031 B1 | 1/2001 | Rauch et al. | 359/216 |
| 6,201,937 B1 | 3/2001 | Folkins | 399/49 |
| 6,219,085 B1 | * 4/2001 | Hanna | 347/249 |
| 6,219,516 B1 | 4/2001 | Furst et al. | 399/301 |
| 6,236,418 B1 | * 5/2001 | Yamakawa | 347/129 |
| 6,275,244 B1 | 8/2001 | Omelchenko et al. | 399/301 |
| 2002/0167680 A1 | * 11/2002 | Saakurai | 358/1.9 |

* cited by examiner

*Primary Examiner*—Hai Pham
(74) *Attorney, Agent, or Firm*—Oliff & Berridge, PLC

(57) ABSTRACT

The relationship between first and second side images is evaluated to determine how the position of the paper and/or the size and arrangement of an image can be manipulated to compensate for paper shrinkage caused by fusing. Show through is reduced by performing setup to adjust a pixel clock frequency and/or a photoreceptor speed, determining a residual magnification error, determining margin shifts to compensate for the residual magnification error, and applying the margin shifts. Paper shrink effects on registration can be compensated for using determinations made during a typical printer setup. Show through errors can be reduced without using a paper conditioner to pre-shrink or re-wet the paper. In simplex and duplex printing, the show through errors worsen as the image moves away from the registration edge. Using information obtained during setup, a margin shift is determined that results in a significant reduction in the maximum show through for each image.

27 Claims, 6 Drawing Sheets

METHOD OF SHIFTING AN IMAGE OR PAPER TO REDUCE SHOW THROUGH IN DUPLEX PRINTING

BACKGROUND OF THE INVENTION

1. Field of Invention

This invention is directed to methods of reducing show through error in duplex printing.

2. Description of Related Art

Duplex printing, i.e. printing in which an image is formed on both sides of a sheet of paper or other image receiving substrate, can be performed using a variety of known systems.

For example, duplex printing can be conducted with a system that forms images on both sides of a sheet at a single transfer station. In some duplex printing systems, after a sheet has received a first image on a first side by passing the sheet through an image transfer station, the sheet is inverted. A second image is then formed on a second side of the sheet by passing the inverted sheet through the same transfer station.

Positioning an image on one side of a sheet in a manner that coincides with the position of the image on the other side of the sheet can be difficult. Registration of a first image on a first side of a sheet with a second image on a second side of a sheet is not always accurate because of one or more registration errors that offset the first image relative to the second image. For example, a page number printed on the bottom-center position of the first side of a two-sided, printed document should align exactly with the page number printed on the reverse side. The offset of the page number on the second side of a sheet with respect to the page number on the first side of the sheet is a registration error that is extremely undesirable, and considered unacceptable in various printing industries.

Registering two images on the front and back sides of a single sheet of paper can be difficult but is essential in industries such as the offset printing industry. In this industry, duplex sheets are sometimes produced having a number of pages, of what will ultimately be a single, multi-page document, aligned on the front and back of a single sheet of paper. To create such a multi-page document, a sheet of paper is printed with multiple images on the front and back side of a single composite sheet. The single composite sheet is subsequently folded and segmented into individual pages. Each of the images on a first side a sheet must therefore be registered with a corresponding image on a second side of the sheet before the sheet may be segmented into individual pages.

Specifically, the first image that appears on the first side of the sheet and the second image that appears on the second side of the sheet are positioned so that identical images printed on both sides of the sheet are coincident with each other. In other words, two identical images printed on both sides of a sheet of paper form mirror images of each other since each image is printed with no apparent offset from the other. Thus, an image on the front side of a sheet would appear to be in perfect or transparent registration with the corresponding image on the back side of the sheet.

To ensure transparent registration, it is essential that the position of the printing substrate be precisely controlled. Active registration systems which sense document position and operate to correct the position of a copy sheet, if necessary, before an image is transferred to the copy sheet are well known. However, even if position is controlled, errors in magnification make achieving such transparent registration difficult. Errors can be attributed to the speed at which an image carrier, such as a photoconductive drum or photoreceptor belt or drum, operates. Magnification errors can also be attributed to the frequency at which a write clock or a pixel clock operates. Another source of magnification errors is the expansion or contraction of paper, coupled with variation in these properties from sheet to sheet. In order to correct such magnification errors, the speed of the photoreceptor belt or drum, or other such device, is adjusted, and the pixel clock frequency is adjusted.

The "show through" error that occurs when transparent registration is not achieved can be quantified by measuring of the displacement between two points, one on a first side of the sheet and one on a second side of the sheet, that are intended to be equidistant from a common sheet edge. This error is caused, at least in part, by the factors identified above. The portion of the error associated with paper shrinkage is often caused by fusing a printed image on the first side prior to printing of an image on the second side.

SUMMARY OF THE INVENTION

In various printing systems, which combine a wide range of paper types with very specific performance specifications, a method of reducing show through error is needed.

This invention provides systems and methods that make margin adjustments to reduce the effects of show-through in duplex printing.

This invention separately provides systems and methods that reduce show through error in duplex printing that compensate for different paper types and sizes.

This invention separately provides systems and methods that reduce show-through in duplex printing resulting from paper shrinkage or growth.

This invention separately provides systems and methods that reduce setup errors that occur when adjusting simplex and duplex magnification errors.

This invention separately provides systems and methods that compensate for errors that result from paper shrinkage caused by fusing during duplex printing.

In various exemplary embodiments of the systems and methods of this invention, show through is reduced by performing registration setup to adjust a pixel clock frequency and/or a photoreceptor belt or drum speed, determining an amount of residual magnification error after performing registration setup, determining margin shifts to reduce the amount of residual magnification error, and applying the margin shifts. In various exemplary embodiments of the systems and methods of this invention, paper shrink effects on registration can be compensated for using determinations made during a typical printer setup. Show through errors can be reduced without using a paper conditioner to pre-shrink or re-wet the paper.

In various exemplary embodiments of the systems and methods of this invention, the relationship between first side image and the second side image is evaluated to determine how the position of the paper and/or the size and arrangement of an image can be manipulated to compensate for the paper shrinkage effects caused by fusing.

In registration systems that use a common edge for simplex and duplex registration, the show through errors become progressively worse as the image moves away from the registration edge. Using information determined and stored in a non-volatile memory of a printing device during an image-on-paper registration setup, determinations can be made to apply a margin shift that results in a significant reduction in the maximum show through for each image.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of this invention will be described in detail, with reference to the following figures, wherein.

DETAILED DESCRIPTION OF PREFERRED EMBODIMENTS

Before an image-on-paper registration setup operation is performed, it is likely that there are errors in the photoreceptor belt or drum speed and the pixel clock frequency. These errors would result in process and lateral magnification errors, respectively, as the image is exposed on the photoreceptor belt or drum. The process direction is the direction in which a sheet moves through a printing apparatus, or the direction parallel to movement from the leading edge to the trailing edge of the sheet. The lateral direction is perpendicular to the process direction. Process magnification error is magnification error in an image measured in the process direction, and lateral magnification error is magnification error in an image measured in the lateral direction.

After the image is transferred, the image is subsequently fused to a sheet of paper, and the paper, along with the images on the paper, shrinks, thereby compounding the magnification errors. There is no direct way to differentiate between the original photoreceptor belt or drum speed error, the pixel clock frequency error and the error caused by paper shrinkage. Also, because the first-formed image passes through the fuser one more time than does the second-formed image, there is also a difference between the magnification error in the image on the first side of the sheet and the magnification error in the image on the second side of the sheet.

In various printing devices, during an image-on-paper setup, the photoreceptor belt or drum speed and the pixel clock frequency are adjusted to correct for the average of the first side and second side magnification errors. Since this adjustment accounts for both machine errors and paper shrink errors, there are intentional residual errors, referred to herein as residual magnification errors, that remain for both the photoreceptor belt or drum speed and the pixel clock frequency. Residual errors are permitted to remain to ensure that the resultant images on a sheet, after accounting for the paper shrink during fusing, are the correct size. Due to residual errors, the first and second images formed on the photoreceptor belt or drum after the setup adjustments would, if measured, have a magnification error. This error has a linearly increasing effect on registration when moving from the leading edge of a sheet to the trailing edge of the sheet in the process direction and from the Start-of-Scan (SOS) sensor to the End-of-Scan (EOS) sensor in the lateral direction.

In some printing devices, registration occurs at the outboard edge and the leading edge of the sheet for the first side, and at the outboard edge and the trailing edge of the sheet for the second side. In such devices, the residual magnification errors can affect process registration on the second side. According to the methods of this invention, a margin shift is invoked to compensate for the setup errors due to the residual magnification error, as well as for the show through errors.

Figure 1:
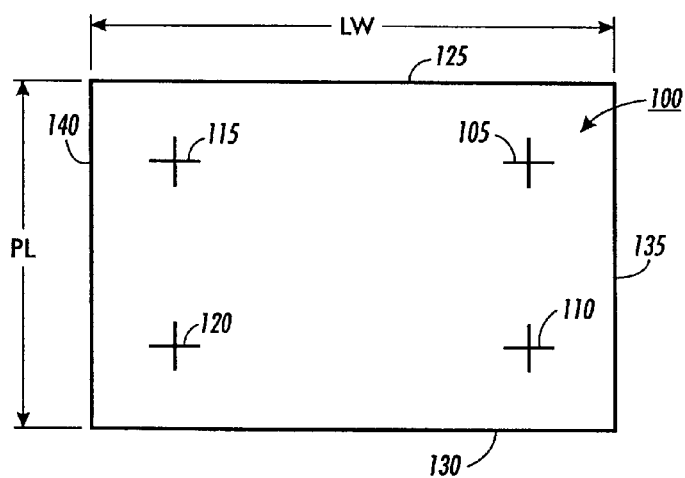
FIG. 1 is a top view of a sheet on which a registration test pattern has been printed.

FIG. 1 illustrates a sheet 100 on which a registration test pattern has been printed. For the purpose of description only, the horizontal and vertical axes of the sheet 100 are referred to relative to the direction that the sheet moves through a printing apparatus. The process length (PL) is the length of an edge of the sheet 100 that runs parallel to the direction that the sheet 100 is fed through a printing apparatus. The lateral width (LW) of the sheet 100 is the length of an edge of the sheet 100 that runs perpendicular to the direction that the sheet 100 is fed through a printing apparatus.

The four edges of a sheet 100 can also be described relative to the direction that the sheet 100 moves through the printing apparatus. The outboard edge 135 and the inboard edge 140 are the edges that define the process length. The outboard edge 135 can refer to the edge of the sheet 100 that is closest to the registration surface of the printing apparatus, and the inboard edge 140 to the opposite edge, i.e., the edge that is farthest from a registration surface. The leading edge 125 and the trailing edge 130 are the edges that define the lateral width of the sheet 100. The leading edge 125 is the forward edge as the sheet 100 moves through a printing apparatus, and the trailing edge 130 is the opposite edge.

Also, solely for the purpose of description, margin corrections towards different edges of the sheet 100 can be assigned positive or negative values. Adjustments towards the inboard and leading edges 140 and 125 of the sheet 100 can be assigned a negative value. Adjustments towards the outboard and trailing edges 135 and 130 can be assigned a positive value. The signs and names assigned to various aspects of the sheet 100 are not intended to limit the systems and methods according to the invention. The methods of this invention can be readily applied to any duplex printing apparatus for printing on any type of substrate, regardless of the names given to define various parts of the sheet 100.

Various exemplary embodiments of the systems and methods according to this invention include performing a setup operation to adjust the pixel clock frequency and/or the photoreceptor belt or drum speed, determining an amount of residual magnification error after performing the setup operation, determining margin shifts to compensate for residual magnification and/or registration error, and applying the margin shifts.

As indicated above, during the setup operation, the photoreceptor belt or drum speed and/or the pixel clock frequency are adjusted as necessary to adjust for the average of the first side and second side magnification errors. After this adjustment, there are residual magnification errors that remain for both the photoreceptor belt or drum speed and the pixel clock frequency. In other words, the images on the photoreceptor belt or drum would, if measured, have a magnification error. At the completion of the setup operation, the registration is perfect at the outboard edge of the first side and the second side, at the leading edge of the first side, and at a distance x from the leading edge of the second side, depending on the size sheet used in the setup operation.

However, since setup specifications are often based on measurements from the trailing edge of the second side of any sized sheet, there is likely to be some second side process registration error on sheets that do not have the same process length as the test sheet used in the setup operation. This is because a sheet is often registered at the same physical edge for the first and second sides in the process direction. If the second side is registered to the trail edge of the sheet, and the registration is initially setup for a given process length, images formed on sheets of a different process length will be susceptible to the effects of magnification errors over the difference in length between the original process length and the new process length of the sheet being printed on. Various exemplary embodiments of the systems and methods according to this invention compensate for this error.

Assuming all other sources of error are equal to zero, which is what the setup operation attempts to accomplish, Table 1 shows the errors that remain because of the residual magnification errors and the paper shrink rates. As indicated above, PL refers to the process length of the sheet being printed on, while LW refers to the lateral width of the sheet being printed on. The residual process magnification error is referred to as $c_P$. The first pass shrink rate of the sheet being printed on in the process direction is referred to as $f_{1P}$. The first pass shrink rate of the sheet being printed on in the lateral direction is referred to as $f_{1L}$. A distance from the leading edge of the second side where the registration error is zero is designated as x. The systems and methods according to this invention determine the errors as outlined below, and apply a margin shift to reduce the effects of show through that result from these errors.

TABLE 1

|  | Process | Lateral |
|---|---|---|
| Side 1 Registration Error at Registration Edge | 0 | 0 |
| Side 2 Registration Error at Registration Edge | $(PL - x) * c_P$ | 0 |
| Minimum Show Through Error at Registration Edge (absolute value) | $(PL - x) * c_P$ | 0 |
| Maximum Show Through at Non-Registration Edge (absolute value) | $PL * (c_P + f_{1P}) - x * c_P$ | $-LW * f_{1L}$ |

In various exemplary embodiments of the systems and methods according to this invention, performing the registration setup operation includes, among other things, printing a registration test image on both a first side and a second side of a sheet, obtaining data by measuring the first image on the first side and the second image on the second side, analyzing the measurement data, and adjusting the pixel clock frequency error and/or the photoreceptor belt or drum speed error based on the analyzed data.

Figure 2:
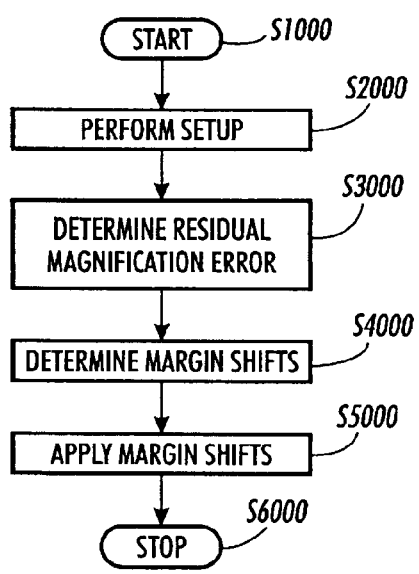
FIG. 2 is a flowchart outlining one exemplary embodiment of a method for correcting show-through in duplex printing according to this invention.

FIG. 2 is a flowchart outlining one exemplary embodiment of a method for reducing show-through in duplex printing according to this invention. As shown in FIG. 2, beginning in step S1000, operation continues to step S2000, where the setup operation is performed to adjust one or both of the pixel clock frequency and/or the photoreceptor belt or drum speed. Then, in step S3000, an amount of residual magnification error is determined. Operation then continues to step S4000. In step S4000, the margin shifts are determined that would compensate for the determined residual magnification and registration error.

Next, in step S5000, the margin shifts are applied. Then, in step S6000, operation ceases.

Figure 3:
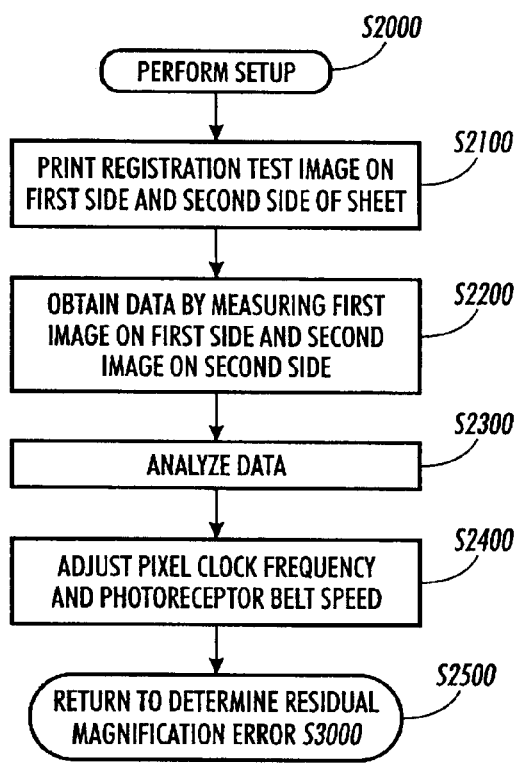
FIG. 3 is a flowchart outlining one exemplary embodiment of a method for performing setup according to step S2000.

FIG. 3 is a flowchart outlining one exemplary embodiment of a method for performing the setup operation of step S2000. Accordingly, beginning in step S2000, operation continues to step S2100, where a registration test image is printed on each of the first and second sides of the sheet.

An exemplary embodiment of the sheet 100 on which a registration test pattern has been printed is illustrated in FIG. 1. In this embodiment, the registration test pattern comprises four cross-hairs 105, 110, 115 and 120 printed in the corners of the sheet 100. According to the systems and methods of the invention, various measurements of the relationship between the position of the marks 105, 110, 115 and 120 of the test pattern, and the position of the test pattern on the sheet 100 are performed for both sides of a duplex printed sheet.

The registration test pattern can be any pattern that permits useful measurements of the first and second images and their positions on the sheet 100 to be made. Any suitable known or later developed pattern that permits measurement of parameters of an image that are usable in the systems and methods according to this invention can be used as the registration test image. However, the registration test image should, at least, permit the sizes of the first side image and the second side image in the lateral and process directions to be measured and thus compared. Using the registration test pattern arrangement illustrated in FIG. 1, various image parameters can be measured during the setup operation. These image parameters can include, but are not limited to, image squareness, image skew, lateral magnification, process magnification and image-to-paper position.

Next, in step S2200, data is obtained by measuring the first image on the first side and the second image on the second side. Obtaining the data can include any suitable known or later developed method of measuring the sizes of the first and second images and determining the positions of the first and second images on the sheet 100. Measurements can be taken by any known or later developed, manual or automated method. Similarly, obtaining the data can include storing the data into any suitable storage or memory device, including, but not limited to, electronic memory. Obtaining the data can also include accessing data that has already been obtained, stored or recorded in prior processes.

Then, in step S2300, the obtained data is analyzed. Analyzing the data can include any known or later developed, manual or automated process of evaluating the obtained data. Analyzing the data can include employing the data in any routine or algorithm that will provide adjustments to overcome magnification error associated with pixel clock frequency error and photoreceptor belt or drum speed error. Operation then continues to step S2400.

In step S2400, the pixel clock frequency and/or the photoreceptor belt or drum speed are adjusted. Adjusting the pixel clock frequency and/or the photoreceptor belt or drum speed includes any suitable known or later developed method of adjusting the pixel clock frequency and/or the photoreceptor belt or drum speed, using the adjustments obtained in analyzing the data. Adjusting pixel clock frequency and/or photoreceptor belt or drum speed also includes any mechanical or electrical manipulations used to that are made to alter the pixel clock frequency and/or the photoreceptor belt or drum speed. This also includes any electronic or mechanical processes for implementing the adjustments. Then, in step S2500, operation returns to step S3000.

Figure 4:
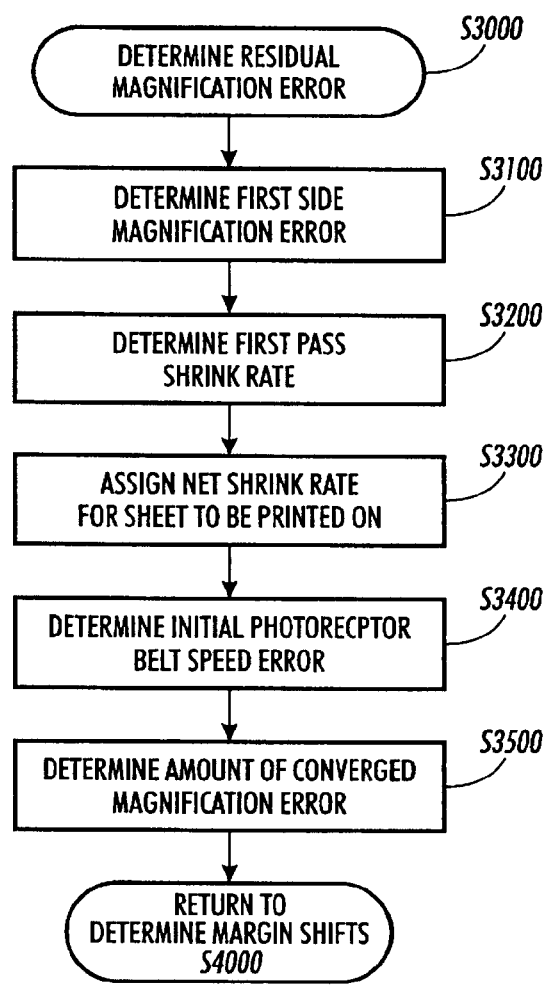
FIG. 4 is a flowchart outlining one exemplary embodiment of a method for determining an amount of residual error according to step S3000.

FIG. 4 is a flowchart outlining one exemplary embodiment of a method for determining the amount of residual error of step S3000. In step S3000, some of the measurements obtained during the setup operation, as illustrated above, are used to determine the relationship between the sizes of the first side and second side images, and thus the total effect of magnification error on the duplex printed document on the copy sheet. In various exemplary embodiments, the determination of residual magnification error is performed with regard to the process direction only, because the effect of the residual lateral magnification errors on the first side and the second side are often equal and opposite, and thus, cancel each other out.

As illustrated in FIG. 4, beginning with step S3000, operation proceeds to step S3100, where the process magnification error is determined. The process magnification error is a value that illustrates the difference between the nominal size of an image in the process direction and the actual size of that image when printed on a first side of a two-sided document. The first side process magnification error can be expressed as:

$$P_{ME1}=(d_1-d_{nom})/d_{nom} \quad (1)$$

where:
$P_{ME1}$ is the process magnification error;
$d_1$ is the actual process image size of the first side image; and
$d_{nom}$ is the nominal process image size of the first side image.

Next, in step S3200, the first pass shrink rate is determined. The first pass shrink rate is a value that illustrates the effect of fusing after printing an image on a first side of a two-side document. The process first pass shrink rate can be determined by comparing the difference between the actual size of an image printed on a first side of a two-sided document and the actual size of an image printed on a second side of a two-sided document, in the process direction. The process first pass shrink rate can be expressed as:

$$f_{1P}=(d_1/d_2-1) \quad (2)$$

where:
$f_{1P}$ is the process first pass shrink rate;
$d_1$ is the actual process image size of the first side image; and
$d_2$ is the actual process image size of the second side image.

Likewise, the lateral first pass shrink rate can be determined by comparing the difference between the actual size of an image printed on a first side of a two-sided document and the actual size of an image printed on a second side of a two-sided document, in the lateral direction. The lateral first pass shrink rate can be expressed as:

$$f_{1L}=(c_1/c_2-1) \quad (3)$$

where:
$f_{1L}$ is the process first pass shrink rate;
$c_1$ is the actual lateral image size of the first side image; and
$c_2$ is the actual lateral image size of the second side image.

Then, in step S3300, a net shrink rate for a sheet of paper to be printed on is assigned or determined. To determine the amount of residual shrink error, the role of the sheet of paper itself must be included in the determination. For each sheet of paper, the net shrinkage of that sheet of paper in the process direction is some percentage, y, of the first pass shrink rate in the process direction $P_{PS1}$. While this percentage could be determined for each and every sheet that is printed, this is generally impracticable. Alternatively, a general rate for all sheets of paper could be used. In various exemplary embodiments of the systems and methods according to this invention, a value is assigned for each different type or size of paper that is used. In various exemplary embodiments, the value y that is assigned to each paper is stored in the non-volatile memory of a printer.

The shrink error is defined as a negative value. Thus, in the process direction, a negative magnification error means the image is larger than the nominal image and a negative shrink error means the image is smaller than the nominal image. When determining the process shrink rate for the first side image, the net shrink rate of an individual sheet of paper, illustrated by the value y, is included. In various exemplary embodiments, separate values of y are assigned for different types and sizes of paper. In various other exemplary embodiments, a default value for y is assigned. In further exemplary embodiments, the value assigned for y is 0.30. The inventors of this invention have determined by testing a variety of papers that 0.30 is a usable default value for a variety of papers. The net first side process shrink error can be expressed as:

$$P_{SE1}=y*f_{1P} \quad (4)$$

where:
$P_{SE1}$ is the net process shrink rate for the first side image;
y is the net shrink rate of the sheet being printed on; and
$f_{1P}$ is the process first pass shrink rate.

Next, in step S3400, the initial photoreceptor belt or drum speed error is determined. The measured magnification error on the first side is attributed to many factors. For the purposes of making a practicable determination of residual magnification error, four factors or sources of error are included in the determination. These sources of error include (1) the original photoreceptor belt or drum speed error, (2) the shrinkage that occurs during the first pass through the fuser, (3) the shrinkage that occurs during the second pass through the fuser, and (4) the re-acclimation of the sheet of paper. Thus, in addition to equation (1), the first side process magnification error can alternatively be expressed as:

$$P_{ME1}=(1+m_P)*(1+f_{1P})*(1+f_{2P})*(1+g_P)-1 \quad (5)$$

where:
$P_{ME1}$ is the first side process magnification error;
$m_P$ is the original photoreceptor belt or drum speed error;
$f_{1P}$ is the first pass shrink rate;
$f_{2P}$ is the second pass shrink rate; and
$g_P$ is the error attributed to re-acclimation.

Like the measured process magnification error on the first side, the first side process shrink error can be attributed to many factors or sources of error. The sources of error include (1) the shrinkage that occurs during the first pass through the fuser, (2) the shrinkage that occurs during the second pass through the fuser, and (3) the re-acclimation of the sheet of paper. Thus, in addition to equation (4), first side process shrink error can alternatively be expressed as:

$$P_{SE1}=(1+f_{1P})*(1+f_{2P})*(1+g_p)-1 \tag{6}$$

where:
$P_{SE1}$ is the first side process shrink error;
$_{1P}f$ is the first pass shrink rate;
$f_{2P}$ is the second pass shrink rate; and
$_P$ is the error attributed to re-acclimation.

In various exemplary embodiments of the systems and methods according to this invention, determining an amount of residual magnification error includes determining an original photoreceptor belt or drum speed error. Having described first side process shrink error and first side process magnification error in equations (1) and (4)–(6), the original photoreceptor belt or drum speed error extracted and expressed as:

$$m_P=[(P_{ME1}+1)/(y*f_{1P}+1)]-1 \tag{7}$$

where:
$m_P$ is the original photoreceptor belt or drum speed error;
$P_{ME1}$ is the first side process magnification error;
y is the net shrink rate of the sheet being printed on; and
$f_{1P}$ is the process first pass shrink rate.

Once the initial photoreceptor belt or drum speed error is determined in step S3400, it is then becomes possible in step S3500, to determine the amount of residual magnification error in the process direction. In step S3500, the initial photoreceptor belt or drum speed error can be compared with the actual adjustments made to the photoreceptor belt or drum speed in the course of the setup operation. The photoreceptor belt or drum speed adjustment rate is a ratio of (1) the difference between the adjusted photoreceptor belt or drum speed and the original photoreceptor belt or drum speed to (2) the original photoreceptor belt or drum speed. The residual magnification error can thus be expressed as:

$$c_p=(1+m_p)*[1+(PR_{ADJ}-PR_{OR})/PR_{OR}]-1 \tag{8}$$

where:
$c_p$ is the residual magnification error;
$m_P$ is the original photoreceptor belt or drum speed error;
$PR_{ADJ}$ is the adjusted photoreceptor belt or drum speed; and
$PR_{OR}$ is the original photoreceptor belt or drum speed.

After the residual magnification error is determined in step S3500, operation continues to step S3600, where operation returns to step S4000.

Determining the margin shift in view of the residual magnification error includes measuring a length and a width of the sheet of paper to be printed on, determining a total margin shift to reduce show through based on the amount of residual magnification error, and assigning portions of the total margin shift to the first and second sides. In various exemplary embodiments, the margin shift usable to adjust for the registration error must be determined and the margin shifts that compensate for residual magnification error must be determined. Further, margin shifts for lateral and/or process residual magnification errors must be determined for the first and second sides of the sheet. These various aspects of determining the margin shift can be conducted in sequence, simultaneously or any other combination or order.

Figure 5:
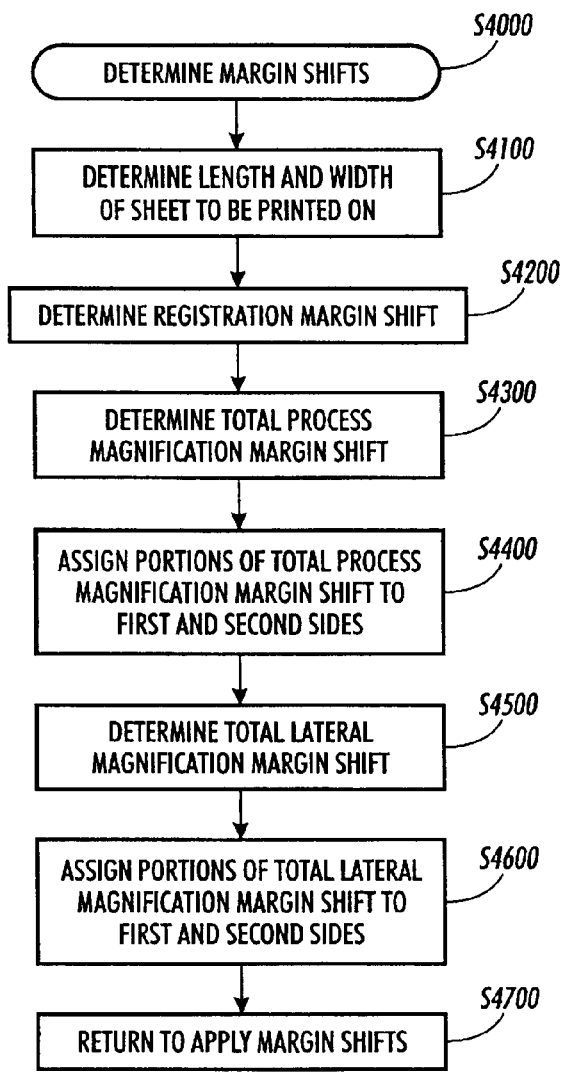
FIG. 5 is a flowchart outlining one exemplary embodiment of a method for determining margin shift according to step S4000.

FIG. 5 is a flowchart outlining one exemplary embodiment of a method for determining the margin shift according to step S4000. As illustrated in FIG. 5, beginning with step S4000, operation continues to step S4100, where the process length PL and lateral width LW of the sheet of paper to be printed on are determined. The process length PL and the lateral width LW can be determined by any suitable method.

Next, in step S4200, a margin shift to compensate for the registration error at the process registration edge of the second side is determined. As mentioned above, second side process registration may be affected by a difference in size between the sheet that was used during the setup operation and the sheet being printed on. A margin shift is implemented on the second side to account for this effect. This process margin shift for registration of the second side image can be expressed as:

$$S_{RP2}=-(PL-x)*c_P \tag{9}$$

where:
$S_{RP2}$ is the process margin shift for the second side registration error;
PL is the process length of the sheet;
x is the distance from the current position of the second side process registration edge to the position where a second side process registration edge should be such that there would be no registration error, i.e. the difference in process lengths; and
$c_P$ is the residual process magnification error.

Next, in step S4300, a margin shift to compensate for show through effects at the leading and trailing edges of the sheet is determined. The process show through error, like the lateral show through, increases linearly as the distance from the lateral registration edge increases. Minimum show through refers to the amount of show through at the registration edge of the sheet, and maximum show through refers to the amount of show through at the opposite non-registration edge. The margin shift is determined to reduce the maximum show through on the sheet. According to various exemplary embodiments of the systems and methods of this invention, the expected minimum and maximum show through values are averaged for a given type and size of paper. This average show through is then partially compensated for by shifting the first side image and partially compensated for by shifting the second side image. The total process show through margin shift can be expressed as:

$$S_{PS}=-PL*f_{1P}/2 \tag{10}$$

where:
$S_{PS}$ is the total process margin shift for show through error;
PL is the process length of the sheet; and
$f_{1P}$ is the first pass shrink rate.

Then, after determining the total amount of margin shift to be applied to correct show through in step S4300, in step S4400, the distribution of this margin shift between the amount that will be applied to shift the first side image and the amount that will be applied to shift the second side image is determined. The total margin shift can be distributed in any suitable manner. In various exemplary embodiments of the systems and methods according to this invention, the first side image is shifted toward the trailing edge of the sheet to compensate for show through error in the process direction.

The process margin shift for the first side image can be expressed as:

$$S_{PS1} = -S_{PS} * z \quad (1)$$

where:
$S_{PS1}$ is the first side process margin shift for show through error;
$S_{PS}$ is the total process margin shift for show through error; and
z is the proportion of the total process margin shift to be applied to the first side image.

In various exemplary embodiments of the systems and methods according to this invention, half of the margin shift is applied to the shift the first side image and half of the margin shift is applied to shift the second side image. In this case, z is equal to 0.5.

In various exemplary embodiments of the systems and methods according to this invention, the second side image is shifted toward the trailing edge of the sheet to compensate for show through error in the process direction. The process margin shift for the second side can be expressed as:

$$S_{PS2} = S_{RP2} - S_{PS} * (1-z) \quad (12)$$

where:
$S_{PS2}$ is the second side process margin shift for show through error;
$S_{PS}$ is the total process margin shift for show through error; and
z is the proportion of the total process margin shift to be applied to the first side image.

As with the determination of residual magnification error, the margin shift can vary for every sheet, as first pass shrink rate varies. However, in various exemplary embodiments, a determination of the process margin shift for every single sheet that is printed is not performed. Accordingly, as indicated above with regard to lateral margin shift, general or default assumptions about the general sheet of paper can be made.

Then in step S4500, determining the margin shift also includes determining a margin shift to compensate for show through effects at the inboard and outboard edges of a sheet. As discussed above, the lateral show through error at any point on the page increases linearly as the distance of that point from the lateral registration edge increases. Minimum show through refers to the amount of show through at the registration edge of the page. While maximum show through refers to the amount of show through at the opposite non-registration edge. The margin shift is determined to reduce the maximum show through on the page.

According to various exemplary embodiments of the methods, the expected minimum and maximum show through values are averaged for a given type and size of paper. This average show through is then partially compensated for by shifting the first side image and partially compensated for by shifting the second side image. Determining the lateral show through takes into consideration the lateral width of the sheet and the lateral first pass shrink rate of the paper. Lateral show through margin shift can thus be expressed as:

$$S_{LS} = LW * f_{1L} / 2 \quad (13)$$

where:
$S_{LS}$ is the total lateral margin shift for show through error;
LW is the lateral width of the sheet; and
$f_{1L}$ is the lateral first pass shrink rate.

As with the process direction analysis performed in step S4400, in step S4600, the distribution of this margin shift between the amount that will be applied to shift the first side image and the amount that will be applied to shift the second side image in the lateral direction is determined. Then, in step S4700, operation returns to step S5000. In various exemplary embodiments of the systems and methods according to this invention, the first side image is shifted toward the inboard edge of the sheet to compensate for show through error in the lateral direction. The lateral margin shift for the first side can be expressed as:

$$S_{LS1} = S_{LS} * w \quad (14)$$

where:
$S_{LS1}$ is the first side lateral margin shift for show through error;
$S_{LS}$ is the total lateral margin shift for show through error; and
w is the proportion of the total lateral image shift to be applied to the first side image.

The total margin shift can be distributed in any suitable manner. In various exemplary embodiments of the systems and methods according to this invention, half of the margin shift is applied to shift the first side image and half of the margin shift is applied to shift the second side image, i.e. w equals 0.5. In this case, the margin shift applied to the first and second side images would thus be one-half of the lateral show through margin shift for side one and negative one-half of the lateral show through margin shift for side two.

In various exemplary embodiments of the systems and methods according to this invention, the second side image is shifted toward the outboard edge of the sheet to compensate for show through error in the lateral direction. The lateral margin shift for the second side can be expressed as:

$$S_{LS2} = -S_{LS} * (1-w) \quad (15)$$

where:
$_{LS2}$ is the second side lateral margin shift for show through error;
$S_{LS}$ is the total lateral margin shift for show through error; and
w is the proportion of the total lateral image shift to be applied to the first side image.

As with determining residual magnification error, it is not practicable to determine the lateral margin shift for every single sheet that is printed. Accordingly, general or default assumptions about the general sheet of paper can be made. In various exemplary embodiments, assumptions are made with regard to various types of paper. Thus, a different lateral margin shift can be applied for each type of paper being used. Assumptions about the lateral first pass shrink rate of a type of paper can then be stored in the non-volatile memory of a printer.

In various exemplary embodiments, all values needed to determine the various margin shifts, outlined above in Eqs. (9), (11), (12), (14) and (15), can be determined during the setup operation and stored in the non-volatile memory of the printing device. In various other exemplary embodiments, the measurements and determinations can be made at least in part by the user. In various exemplary embodiments, values for the lateral width, the process length, and the weight of a sheet of paper can be obtained on a sheet by sheet basis to make adjustments to margin shifts associated with the various types of sheets.

According to this invention, step S5000, in which the margin shift is applied, includes applying the second side process registration margin shift $S_{RP2}$ and each of the lateral and process, first and second side magnification margin shifts $S_{LS1}$, $S_{LS2}$, $S_{PS1}$ and $S_{PS2}$ to shift the positions of the first side and second side images on the first and second sides of the sheet, respectively, to reduce show through. As with determining the margin shifts, the margin shifts can be applied in any sequence, simultaneously or any combination thereof. Applying the margin shifts can include any manual or automated process of manipulating the sheet or printing apparatus to achieve the desired margin shifts.

Figure 6:
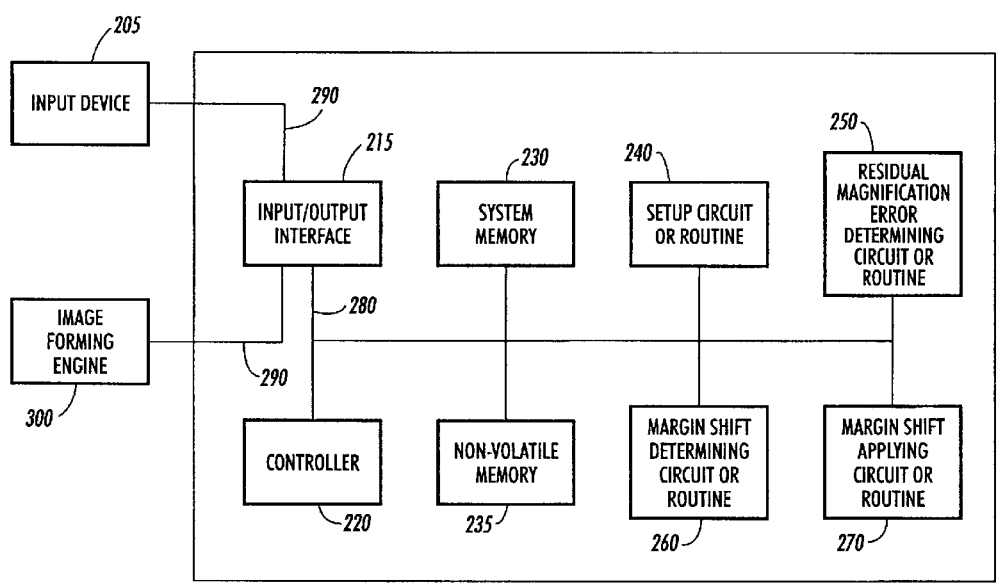
FIG. 6 is a block diagram of one exemplary embodiment of a control system for reducing show through error in duplex printing, according to this invention.

FIG. 6 is a functional block diagram of one exemplary embodiment of the control system 200 according to this invention, usable to generate and apply the margin shifts discussed above, and to controllably output the shifted image data to an image forming engine 300 based on the determined margin shifts. As shown in FIG. 6, the control system 200 includes an input/output interface 215, a controller 220, a non-volatile memory 230, a system memory 235, a setup circuit or routine 240, a residual magnification error determining circuit or routine 250, a margin shift determining circuit or routine 260, and a margin shift applying circuit or routine 270, interconnected by a data/control bus or the like 280. One or more input devices 205 are connected by a link 290 with the input/output interface 215.

As shown in FIG. 6, each of the system memory 230 and the non-volatile memory 235 can be implemented using either or both of alterable or non-alterable memory. In FIG. 6, the alterable portions of the memories 230 or 235 are each, in various exemplary embodiments, implemented using static or dynamic RAM. However, the alterable portions of each of the memories 230 and 235 can also be implemented using a floppy disk and disk drive, a writable optical disk and disk drive, a hard drive, flash memory or the like. In FIG. 6, for each of the system memory 230 and the non-volatile memory 235, the non-alterable portions of the memories 230 and 235 are each, in various exemplary embodiments, implemented using ROM. However, the non-alterable portions can also be implemented using other non-volatile memory, such as PROM, EPROM, EEPROM, an optical ROM disk, such as a CD-ROM or a DVD-ROM, and disk drive, or other non-alterable memory, or the like.

Thus, for each of the memories 230 and 235, those memories 230 and 235 can each be implemented using any appropriate combination of alterable, volatile, or non-volatile memory or non-alterable or fixed memory. The alterable memory, whether volatile or non-volatile, can be implemented using any one or more of static or dynamic RAM, a floppy disk and disk drive, a writable or re-writable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or a DVD-ROM disk and disk drive or the like.

It should be appreciated that the control system 200 shown in FIG. 6 can be implemented as a portions of a programmed general purpose computer used to control the overall operation of the image forming engine. Alternatively, the control system 200 can be implemented using an ASIC, a FPGA, a PLD, a PLA, or a PAL, or using physically distinct hardware circuits, such as discrete logic elements or discrete circuit elements. The particular form the controller 220 shown in FIG. 6 will take is a design choice and will be obvious and predictable to those skilled in the art. Alternatively, the control system 200 can be implemented as a portion of a software program usable to form the overall control system of the image forming engine. In this case, each of the controller 220 and the various circuits or routines 240–270 can be implemented as software routines, objects and/or application programming interfaces or the like.

In general, the one or more input devices 205 will include any one or more of a keyboard, a keypad, a mouse, a track ball, a track pad, a touch screen, a microphone and associate voice recognition system software, a joy stick, a pen base system, or any other known or later-developed system for providing control and/or data signals to the control system 200. The input device 205 can further include any manual or automated device usable by a user or other system to present data or other stimuli to the control system 200.

The link 290 can be any known or later-developed device or system for connecting the input device 205 to the control system 200, including a direct cable connection, a connection over a wide area network or a local area network, a connection over an intranet, a connection over the Internet, or a connection over any other known or later-developed distributed processing network or system. In general, the link 290 can be any known or later-developed connection system or structure usable to connect the input device 205 to the control system 200.

In operation, the user operates the control system 200 to cause the image forming engine to print a registration test image, such as that shown in FIG. 1, on the first and second sides of a sheet. The user then operates the input device 205 to submit measurements obtained from the registration test image to the control system 200. The measurements can include, but are not limited to, image squareness, image skew, lateral magnification, process magnification and image-to-paper position. The various measurements obtained from the registration test image are then stored by the controller 220 in one or both of the non-volatile memory 230 and the system memory 235.

The controller 220 then accesses at least some of the measurements stored in one or both of the non-volatile memory 230 and the system memory 235 and supplies the accessed measurements to the setup routine or circuit 240. The setup routine or circuit 240, under control of the controller 220 and in cooperation with the image forming engine 300, adjusts the photoreceptor belt or drum speed and/or the pixel clock frequency as necessary to adjust for the average of the first side and second side magnification errors. Upon completion of the setup operation performed by the setup routine or circuit 240, the controller 220 stores the data generated by the setup circuit or routine 240, including but not limited to the nature and extent of the adjustments to the pixel clock frequency and/or the photoreceptor belt or drum speed, in one or both of the non-volatile memory 230 or the system memory 235. The adjustment data is then output under the control of the controller 220 through the input/output interface 215 by the link 290 and the data/control bus or the like 290 to the image forming engine 300.

The controller 220 then provides at least some of the data stored in one or both of the non-volatile memory 230 or the system memory 235 to the residual magnification error determining circuit or routine 250. The residual magnification error determining circuit or routine 250, under control of the controller 220, determines first pass shrink rates and an amount of residual magnification error. Upon completion of the residual magnification error determining operation by the residual magnification error determining circuit or routine 250, the controller 220 stores at least the values for first pass shrink rates and the amount of residual error determined by the residual magnification error determining circuit or routine 250 in one or both of the non-volatile memory 230 or the system memory 235.

The controller 220 then accesses at least some of the data stored in one or both of the non-volatile memory 230 or the system memory 235 and provides the accessed data to the margin shift determining circuit or routine 260. The margin shift determining circuit or routine 260, under the control of the controller 220, determines margin shifts to reduce registration error and to reduce show through error. Upon completion of the margin shift determining operation by the margin shift determining circuit or routine 260, the controller 220 then stores the values for registration margin shift and process and lateral show through margin shifts and first and second sides determined by the margin shift determining circuit or routine 260 in one or both of the non-volatile memory 230 or the system memory 235.

The controller 220 then accesses at least some data from one or both of the non-volatile memory 230 or the system memory 235 and provides the accessed data to the margin shift applying circuit or routine 270. The margin shift applying circuit or routine 270, under the control of the controller 220, generates data usable by the image forming engine 300 and/or by the controller 220, or another controller (not shown) that controls supplying image data or desired paper position to the image forming engine 300, to adjust the image position by applying the margin shifts determined by the margin shift determining circuit or routine 260. Thus, in various exemplary embodiments, the margin shift applying data is output, under the control of the controller 220, through the input/output interface 215 over the link 290 to the image forming engine 300, or to the other controller. Alternatively, the controller 220 transfers the margin shift applying data from the margin shift applying circuit or routine 270 into the one or both of the non-volatile memory 230 or the system memory 235 for later use by the controller 220 in modifying the image data based on the determined margin shifts.

While this invention has been described in conjunction with the specific embodiments above, it is evident that many alternatives, combinations, modifications, and variations are apparent to those skilled in the art. Accordingly, the preferred embodiments of this invention, as set forth above are intended to be illustrative, and not limiting. Various changes can be made without departing from the spirit and scope of this invention.

What is claimed is:

1. A method of reducing show-through error in duplex printing, comprising:
   determining at least one of sizes and locations of a first side image and a second side image of a duplex-printed image recording medium;
   determining an amount of residual magnification error based on the determined at least one of sizes and locations, comprising:
      determining a magnification error for the first side based on the determined at least one of sizes and locations,
      determining a first pass shrink rate based on the determined at least one of sizes and locations,
      assigning a net shrink rate for the image recording medium,
      determining at least an initial pixel clock frequency error and a photoreceptor speed error based on the determined magnification error for the first side, the assigned net shrink rate and the determined first pass shrink rate, and
      determining the amount of residual magnification error based on the determined initial pixel clock frequency error and the photoreceptor speed error; and
   determining margin shifts that reduce show-through error due to at least the residual magnification error based on the determined amount of residual magnification error;
   wherein the determined margin shifts can be subsequently applied during printing of image data to reduce show-through error.

2. The method of claim 1, wherein determining the magnification error for the first side comprises determining a magnification error for a process direction.

3. The method of claim 1, wherein determining a first pass shrink rate comprises determining a first pass shrink rate for a lateral direction and a first pass shrink rate for a process direction.

4. The method of claim 1, wherein assigning a net shrink rate for the image recording medium comprises assigning separate net shrink rates to each of at least two different types of image recording media.

5. The method of claim 1, wherein assigning a net shrink rate for the image recording medium comprises assigning a net shrink rate usable with any image recording media.

6. The method of claim 1, wherein determining the amount of residual magnification error comprises determining the amount of residual magnification error for a process direction of the sheet.

7. A method of reducing show-through error in duplex printing, comprising:
   determining at least one of sizes and locations of a first side image and a second side image of a duplex-printed image recording medium;
   determining an amount of residual magnification error based on the determined at least one of sizes and locations;
   determining margin shifts that reduce show-through error due to at least the residual magnification error based on the determined amount of residual magnification error, comprising:
      determining a process length of the image recording medium to be printed on,
      determining a registration margin shift to reduce registration error based on the determined process length and the determined amount of residual magnification error,
      determining a total margin shift to reduce show-through based on the determined amount of residual magnification error, and
      assigning a first portion and a second portion of the total margin shift to the first and second sides, respectively;
   wherein the determined margin shifts can be subsequently applied during printing of image data to reduce show-through error.

8. The method of claim 7, wherein determining the at least one of sizes and locations comprises:
   printing the first side image on a first side of the image recording medium and the second side image on a second side of the image recording medium;
   obtaining at least one of sizes and locations by measuring the first side image and the second side image.

9. The method of claim 2, further comprising analyzing the at least one of sizes and locations.

10. The method of claim 9, further comprising adjusting at least one of a pixel clock frequency and a photoreceptor speed based on the analyzed at least one of sizes and locations.

11. The method of claim 7, wherein determining the process length of the image recording medium to be printed on comprises determining a process length of each image recording medium to be printed on.

12. The method of claim 7, wherein determining the process length of the image recording medium to be printed on comprises determining a process length for at least two groups of image recording media to be printed on.

13. The method of claim 7, wherein determining the registration margin shift to reduce registration error comprises determining a second side process registration margin shift.

14. The method of claim 7, wherein determining the total margin shift to reduce show-through error based on the determined amount of residual magnification error comprises determining a total process margin shift in the process direction of the image recording medium.

15. The method of claim 14, wherein determining the total margin shift to reduce show-through error based on the determined amount of residual magnification error further comprises determining a total lateral margin shift in the lateral direction of the image recording medium.

16. The method of claim 7, wherein assigning the first portion and the second portion of the total margin shift to the first and second sides comprises assigning one half of the total margin shift to the first side of the sheet and one half of the total margin shift to the second side of the image recording medium.

17. A control system of for controlling a duplex printing device, the device having a raster optical scanner, a photoreceptor belt or drum and a fuser, comprising:

an input/output interface through which at least one input measurement can be input to the control system;

a residual magnification error determining circuit or routine that determines a residual magnification error based on the at least one input measurement;

a margin shift determining circuit or routine that determines margin shifts based on the at least one input measurement and the determined residual magnification error; and a margin shift applying circuit or routine that applies the determined margin shifts during a subsequent duplex printing operation to reduce show-through error;

wherein the residual magnification error determining circuit or routine determines a first side magnification error and a first pass shrink rate based on the at least one input measurement.

18. The control system of claim 17, wherein the setup circuit or routine adjusts pixel clock frequency and photoreceptor speed based on the determined magnification error.

19. The control system of claim 17, wherein the residual magnification error determining circuit or routine determines a first side magnification error based on the at least one input measurement.

20. The control system of claim 17, wherein the margin shift determining circuit or routine determines a total margin shift based on at least some of the at least one input measurement and the first pass shrink rate determined by the residual magnification determining circuit or routine.

21. The control system of claim 17, wherein the residual magnification error determining circuit or routine determines an initial photoreceptor error, based on the determined first side magnification error and the determined first pass shrink rate.

22. The control system of claim 21, wherein the residual magnification error determining circuit or routine determines the residual magnification error based on the determined residual magnification error and data generated by the setup circuit or routine.

23. The control system of claim 17, wherein the margin shift determining circuit or routine determines a registration error based on the at least one input measurement, and the residual magnification error determined by the residual magnification determining circuit or routine.

24. The control system of claim 17, further comprising a magnification error circuit or routine that determines a magnification error based on at least one input measurement, wherein the residual magnification error determining circuit or routine determines a residual magnification error based on the determined magnification error and the at least one input measurements.

25. A control system for controlling a duplex printing device, the device having a raster optical scanner, a photoreceptor belt or drum and a fuser, comprising:

an input/output interface through which at least one input measurement can be input to the control system;

a residual magnification error determining circuit or routine that determines a residual magnification error based on the at least one input measurement;

a margin shift determining circuit or routine that determines margin shifts based on the at least one input measurement and the determined residual magnification error; and a margin shift applying circuit or routine that applies the determined margin shifts during a subsequent duplex printing operation to reduce show-through error;

wherein the margin shift determining circuit or routine determines a registration error based on at least some of the at least one input measurement and the residual magnification error determined by the residual magnification determining circuit or routine, and a total margin shift based on at least some of the at least one input measurement and a first pass shrink rate.

26. The control system of claim 25, wherein the margin shift determining circuit or routine determines margin shifts for the first side and the second side, based on the determined total margin shift.

27. The control system of claim 25, further comprising a magnification error circuit or routine that determines a magnification error based on at least one input measurement, wherein the residual magnification error determining circuit or routine determines a residual magnification error based on the determined magnification error and the at least one input measurements.

* * * * *